US008725738B1

(12) United States Patent
High

(10) Patent No.: US 8,725,738 B1
(45) Date of Patent: May 13, 2014

(54) SYSTEM OF ORGANIZING, DISPLAYING AND SEARCHING DATA

(75) Inventor: Jeffrey High, Davenport, IA (US)

(73) Assignee: Gemvision Corporation, LLC, Davenport, IA (US)

( * ) Notice: Subject to any disclaimer, the term of this patent is extended or adjusted under 35 U.S.C. 154(b) by 866 days.

(21) Appl. No.: 12/916,225

(22) Filed: Oct. 29, 2010

(51) Int. Cl.
   *G06F 17/30* (2006.01)
(52) U.S. Cl.
   USPC ........... 707/740; 707/736; 707/758; 715/213; 715/764; 706/12; 706/14
(58) Field of Classification Search
   None
   See application file for complete search history.

(56) References Cited

U.S. PATENT DOCUMENTS

| | | | | |
|---|---|---|---|---|
| 7,636,509 B2* | 12/2009 | Davis | | 386/239 |
| 8,019,774 B2* | 9/2011 | Narahara | | 707/769 |
| 8,345,982 B2* | 1/2013 | Gokturk et al. | | 382/190 |
| 2008/0301546 A1* | 12/2008 | Moore et al. | | 715/243 |
| 2009/0077039 A1* | 3/2009 | Narahara | | 707/3 |
| 2010/0023858 A1* | 1/2010 | Ryu et al. | | 715/702 |
| 2010/0131533 A1* | 5/2010 | Ortiz | | 707/758 |
| 2010/0166339 A1* | 7/2010 | Gokturk et al. | | 382/305 |

* cited by examiner

*Primary Examiner* — Hung Le
(74) *Attorney, Agent, or Firm* — Roy Kiesel Ford Doody & Thurmon

(57) ABSTRACT

A system for organizing and searching data, representing objects, in a database. The data is organized into subsets according to the objects' characteristics. A value is assigned to each subset member according to the degree it possesses the relevant characteristic. Each subset is organized into a linear progression according to the characteristic values of the subset member. Next, a beginning subset is selected. A portion of the selected subset is displayed as a linear progression, along which the searcher may scroll to view the subset members. Selecting an object from the linear progression will prompt the system to determine whether the object is a member of other subsets. If so, a portion of those subsets will be displayed as linear progressions intersecting the original linear progression at the selected object. The searcher may either continue scrolling along the original linear progression or begin scrolling along an intersecting linear progression.

16 Claims, 8 Drawing Sheets

SYSTEM OF ORGANIZING, DISPLAYING AND SEARCHING DATA

FIELD OF THE INVENTION

The invention relates to data searching in general and to visual searches in particular.

BACKGROUND OF THE INVENTION

Many different forms of searching computer based data are known. One of the most well known is boolean searching. In boolean searching, a condition is tested to determine if it is true or false. For example, a database might be searched for documents containing the word "green." If green is found in the document, the document is treated as being "true" for purposes of the query. Likewise, if green is not found in the document, the document is treated as being "false" for purposes of the query.

Boolean searching allows the searcher to link various queries using boolean operators. The principle boolean operators are AND, OR, NOT and NEAR. AND requires both queries to return a "true" response for a document or data point to be treated as responsive. OR requires either query to return a "true" response for a document or data point to be treated as responsive. NOT requires the first query to return a "true" response and the second query to return a "false" response. Finally, NEAR requires both queries to return a "true" response, and it requires the objects of the query to appear within a predetermined distance of one another in the document or data point. Thus, for example, one searching for a document about green grass could search for green AND grass. Only documents containing both terms would be returned. Similarly, one searching for information about anything green as well any type of grass could search for green OR grass. Documents containing either term would be returned. One searching for information on grasses other than green grasses could search for grass NOT green. Only documents containing grass but also not containing green would be returned. Finally, one could attempt to eliminate results not pertaining to green grass by searching for green NEAR grass. Both green and grass would have to be present in the document and the terms would have to be within a predetermined distance of each other for the document to be responsive.

Boolean searching works well for "keyword" searches and is particularly effective for searching documents. However, boolean searching can also be used to search other concrete conditions. For example, one searching for long articles on grass could search for grass and (pages >100). To be responsive, an article would have to include the word grass and be over one hundred pages.

Boolean searches can be used for databases containing visual elements as well. For example, instead of searching for documents containing the word green, one could search for shirts that are green by entering the boolean operator color=green. Only green shirts would be returned. However, at this point some of the difficulties with boolean searching begin to become apparent. For boolean operators to work, objects in the database must be coded. If an object is coded as green, a boolean search for green will return the object. If an object is not so coded, it will not be returned. How then, to code an object that is "teal?" Similarly, how to search for it?

If a teal shirt is coded green, it will be returned in the green search, along with numerous other shirts of various other shades of green (myrtle, forest, emerald, etc.). This creates potential problems in that the searcher may be looking for a teal shirt and could receive results that include so many non-responsive items that the desired object is difficult to locate. The opposite problem exists if the teal shirt is coded as teal. In this instance, if the searcher searches for green shirts, the teal shirt may not be returned at all.

The foregoing problems may be partially overcome by coding the shirt or other object as teal and green. However, this raises other problems. First, to effectively find the sought object, the searcher must know that the shade of green he or she is seeking is called teal, or myrtle or forest, as the case may be. If the searcher does not know that the shade sought is called teal or myrtle, then he cannot effectively narrow his search results from the universe of green shirts down to teal shirts or myrtle shirts. Second, the ability to narrow the search down by shade requires the searcher and the person who coded the objects to agree on what is teal. If the coder considered an object to be more of a tropical rain forest and coded it as such, our searcher who thinks he is looking for a teal shirt is unlikely to find it with a boolean search drawn to teal.

Another difficulty with boolean based searching is that our searcher may think he is looking for a teal green shirt, but if he were to view a teal blue shirt, would realize that teal blue is really closer to what is desired. Even though teal blue is quite close to teal green, the searcher is unlikely to uncover any teal blue shirts (or shirts of other proximate shades) via a strictly boolean search.

The foregoing problems involving color apply with equal or greater force to other search criteria. Consider a search for a frilly blouse or an abstract painting. It is extremely difficult for the searcher to frame a boolean search that will locate a blouse with a medium amount of "frilliness." If a searcher finds a blouse that she finds to be too frilly, how can she design a boolean search that would return blouses that are less frilly. Similarly, how could a searcher design a boolean search for a painting with more red hues and that is simultaneously less abstract compared to another.

All of the foregoing highlight another problem with boolean searching. The issue is often more fundamental than the searcher not knowing precisely what to call the item being sought. Often, the searcher simply does not know what she is seeking at all. She'll know it when she sees it, but she'll need to browse to find it. Boolean searching is poorly suited to allowing the searcher to browse, and browsing at random can be daunting and frustrating. The searcher can be forced to work through numerous wholly irrelevant objects in order to find the object desired, and when an object is found that is close but not quite right, it can be difficult for the searcher to view more objects like the close item.

In view of the foregoing deficiencies in the prior art, a method and device satisfying one or more of the following objectives is desired.

OBJECTS OF THE INVENTION

It is an object of the invention to provide an improved method of searching databases.

It is another object of the invention to provide a method for searching objects within a database according to the visual appearance of the objects.

It is still another object of the invention to provide a method for searching objects within a database that allows one to search for objects having similar visual appearances.

It is yet another object of the invention to provide a method of searching a database that allows the searcher to browse the database in a progressive fashion.

It is still another object of the invention to provide a method for searching objects within a database that does not require the searcher to know the vocabulary with which objects in the database are commonly described.

SUMMARY OF THE INVENTION

A system for organizing, searching, and retrieving data is disclosed. The system will preferably be performed on a computer or a computer network containing a database. Objects in a database are first organized according to characteristics possessed by the objects. The objects will be grouped into subsets according to the presence of each characteristic.

Once the subsets have been formed, they will be organized. This occurs by assigning a value to the object corresponding to the characteristic in question. Once a value is assigned to the characteristic, the subsets are organized in a continuum corresponding to their respective characteristic values.

Once the organization is complete, the database will have been organized into a series of subsets. Representative samples of each subset are preselected and displayed to the searcher. The searcher will choose one of the representative sample, and the selected subset will be displayed as a linear progression of the objects contained therein. The searcher may then scroll through the linear progression of the selected subset. By selecting the image of the object of interest with a mouse or other input device, the searcher will trigger an evaluation by the system.

The system will check the selected object to determine the number, if any, of other subsets of which the selected object is a member. Those other subsets will then be displayed on the display device as linear progressions intersecting the linear progression of the original selected subset at the selected object.

Selecting an object from one of the intersecting linear progressions will cause the subset corresponding to that linear progression to become the selected subset. The searcher may then scroll through the linear progression of the new selected subset or the searcher may select an object from one of the intersecting linear progressions.

DETAILED DESCRIPTION OF THE INVENTION

Figure 6:
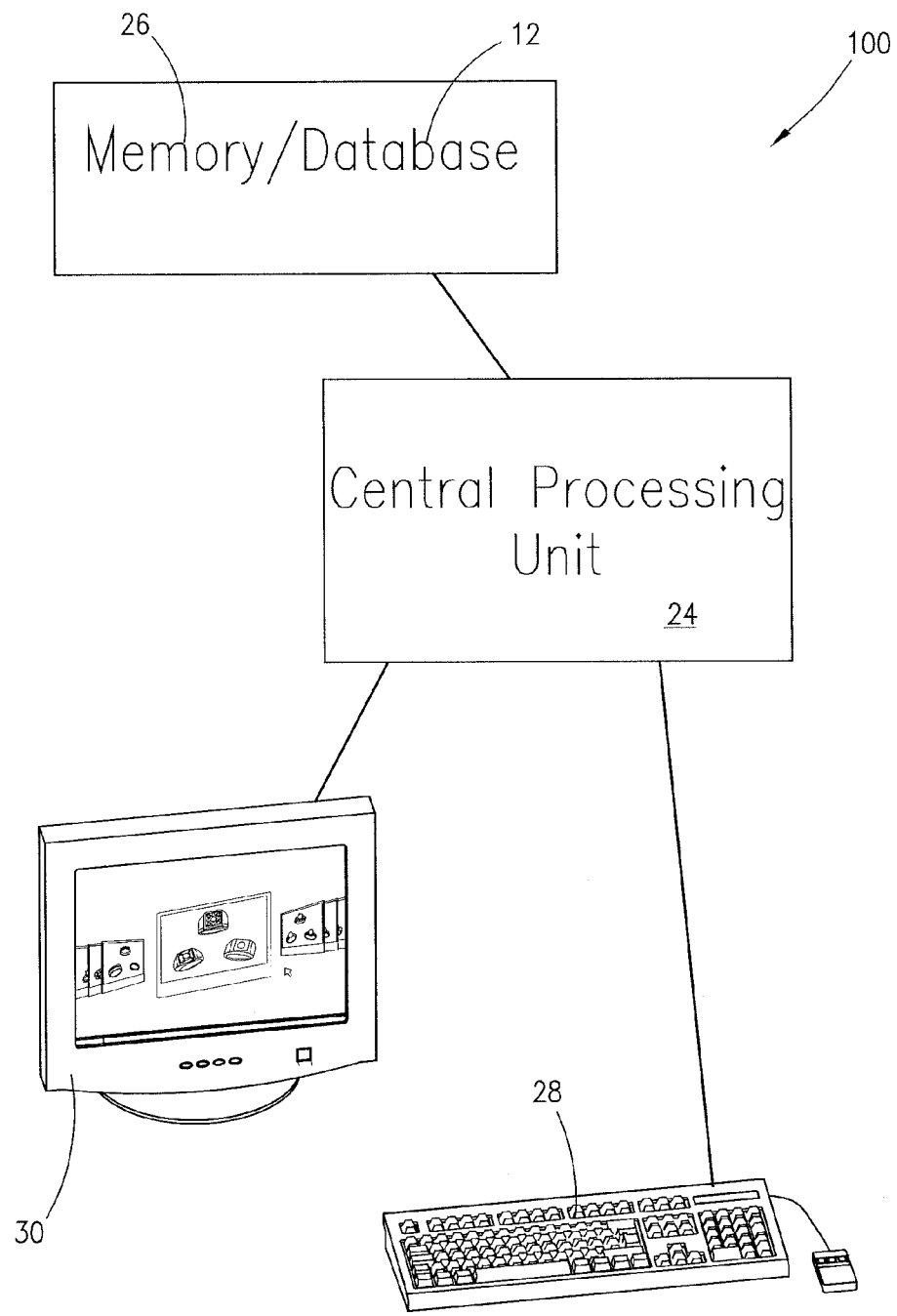
FIG. 6 is a schematic diagram depicting an embodiment of the invention.

A system 100 for organizing and searching data is disclosed. As shown in FIG. 6, the system 100 will preferably be performed on a computer or a computer network containing a central processing unit 24, an input device 28 such as a mouse or a keyboard, or a touch screen, a display device 30 such as a color monitor or mobile device, and memory 26. The memory 26, input device 28 and display device 30 are operatively connected to the central processing unit 24. In one embodiment, one or more of the connections are via the interne.

Continuing with FIG. 6, a database 12 is preferably stored in the memory 26. The inventor's preferred database 12 format is a Microsoft SQL Server 2008. In one embodiment, the objects are housed in a Microsoft SQL Server 2008 in a location remote from the searcher. The database contents are transmitted, as copy protected modified .zip files, to an SQLite database located proximate the searcher. In this embodiment, the SQLite database is accessed by central processing unit 24.

Figure 1:
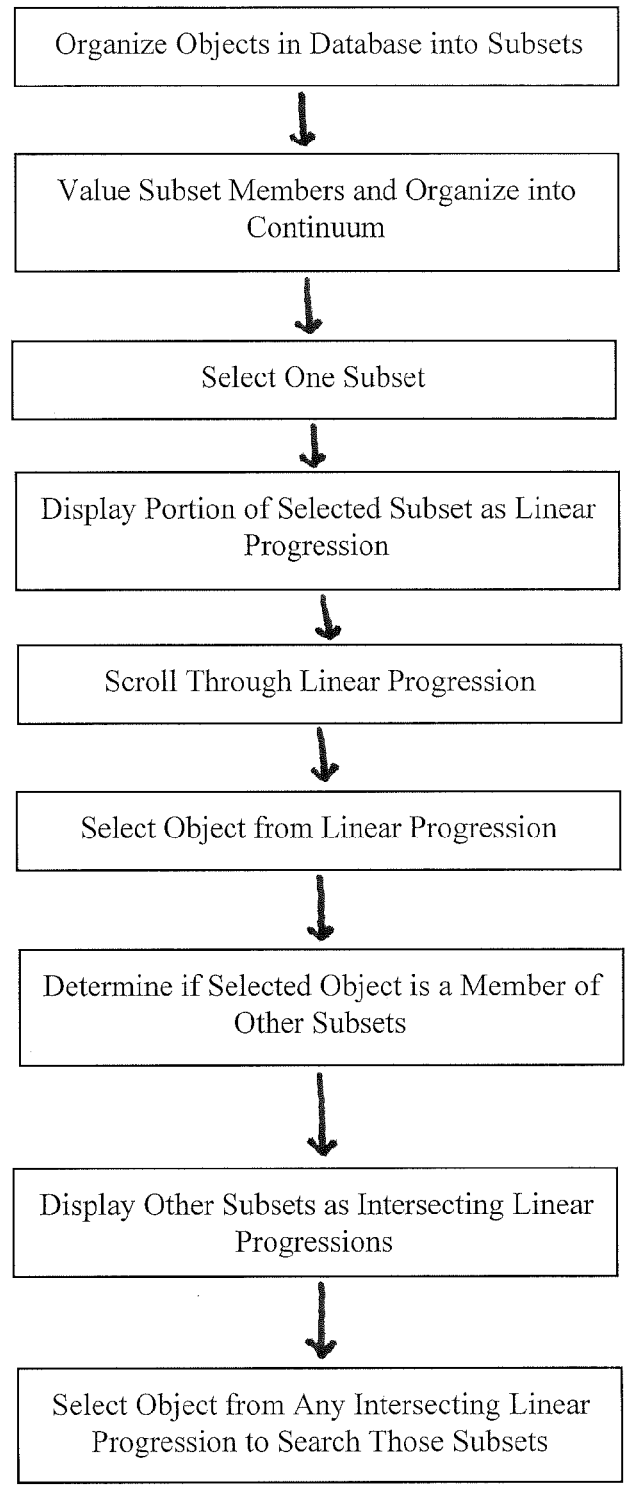
FIG. 1 is a flow chart depicting an embodiment of the present invention.

Objects 10 in a database 12 are first organized according to characteristics possessed by the objects. Continuing with FIG. 1, the system 100 for organizing and searching data will contain a central processing unit 24 capable of and configured to carry out all of the tasks discussed below. The central processing unit 24 is connected to a display device 30 and an input device 28. The central processing unit 24 will also have the ability to display a cursor 50 on the display device 30, although a cursor may not be necessary, particularly in touch screen applications. The central processing unit 24 can also be equipped with a searcher interface. The searcher interface can be written in .Net C# language (C Sharp). The inventor's recommended system requirements are an Intel® Core 2 Duo or AMD® Dual Core processor, a NVidia® GeForce video card with 512 MB RAM, 2 GB System RAM, and 100 GB Disk Space. However, it will be appreciated that these are 2010 recommendations, and that the ideal system parameters will undoubtedly evolve rapidly given the nature of the computer field.

In an embodiment, the database 12 will be stored in memory 26 remote from the central processing unit 24, input device 28, and display device 30. The searcher will access the database 12 remotely via the interne or other remote access system.

The objects 10 in the database 12 will be grouped into subsets 14 according to the presence of each characteristic. The objects 10 can be any items susceptible to search including jewelry 20 such as rings 22. Additionally, the objects can be any type of jewelry such as earrings, necklaces, bracelets. The system 100 and method disclosed herein can be used to search any category of objects with characteristics which allow them to be grouped into the a plurality of subsets. The characteristics may be subjective or objective characteristics. For example, a group of rings could be organized according to increasing complexity of the scroll work on the ring in one subset 14 and increasing total metal weight in another subset 14. Each subset 14 may comprise all of the database 12 or only portions of the database. Each object 10 in the database 12 will preferably be a member of at least one subset, and each object 10 in the database 12 may be a member of several subsets.

Once the subsets 14 have been formed, they will be organized. This occurs by assigning a value to the object 10 corresponding to the characteristic in question. It is important to appreciate that the assignment of a value may be explicit, such as this ring weighs X grams or it may be implicit, such as this ring has scroll work that is more complex than ring A and that is less complex than ring B. It will be appreciated that positioning an object 10 between two other objects 10 on a continuum necessarily gives a value to the placed object 10 as being greater than one object and less than the other on the scale that serves as the organizing basis of the continuum. It will also be appreciated that it may be desired to include objects that lack the defining characteristic of a subset. For example, it may be useful to allow a searcher to advance through a subset of rings starting with one having no scroll work and ending with one that is heavily scrolled. In this situation, the ring with no scrolling would possess the scrolling characteristic at a value of zero.

Once a value is assigned to the characteristic, the subsets 14 are organized in a continuum corresponding to their respective characteristic values as shown in FIG. 3. Again, it is important to appreciate that valuing and organizing may take place simultaneously, as when one ring is placed between two others in terms of scroll work complexity or when one painting is placed above another in terms of degree of abstraction.

Once the organization is complete, the database 12 will have been organized into a series of subsets, each organized according to a single characteristic and each grouped in an ascending (or descending, depending upon one's perspective) continuum of items according to that characteristic. Thus, one subset 14 might be a group of rings having progressively more complex scroll work and a second subset 14 might be a group of rings that are progressively heavier. The members of each subset 14 may or may not be members of the other subset(s). Individual subsets 14 may include all objects 10 in the database 12 or smaller groupings thereof.

Figure 2:
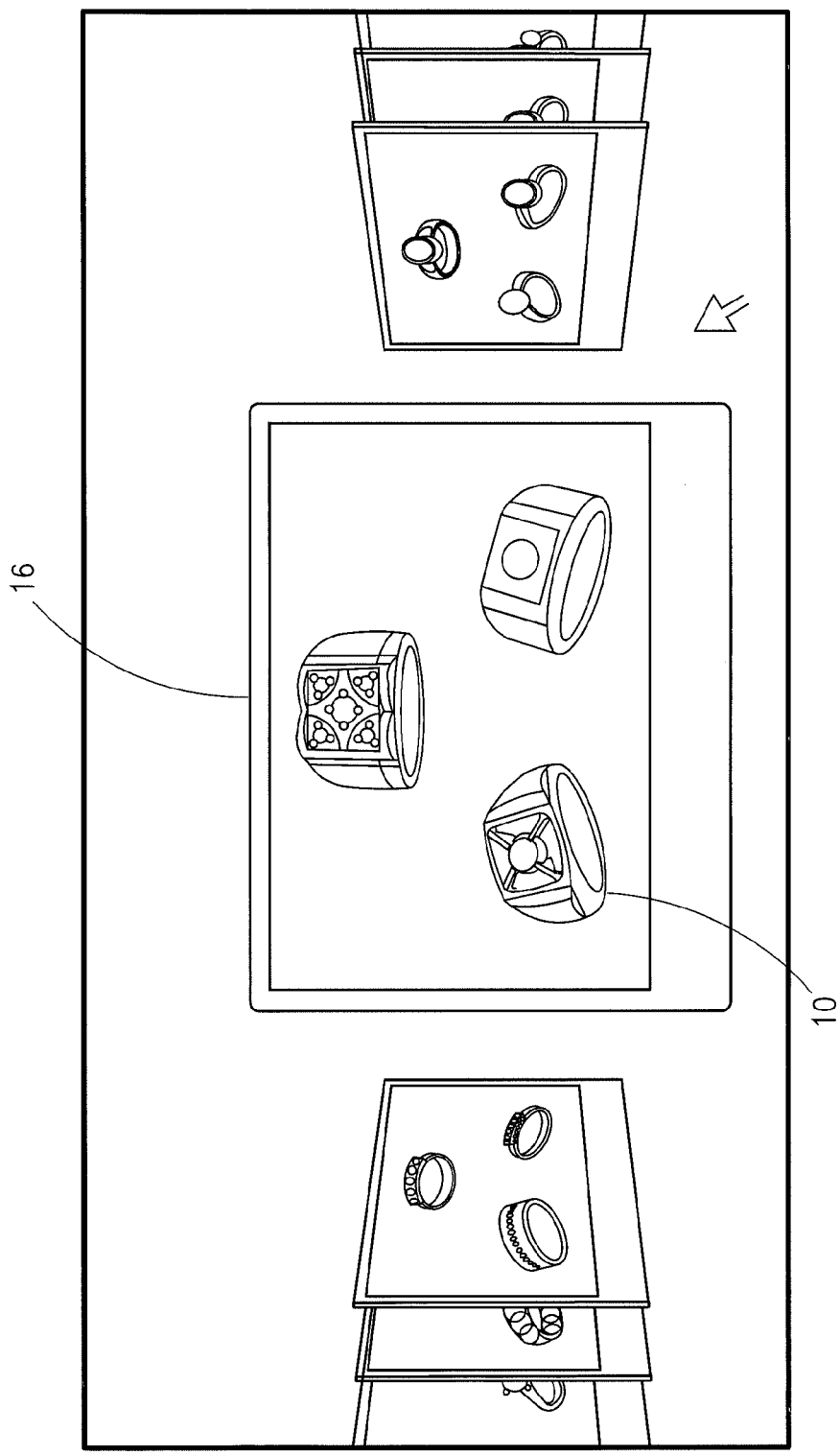
FIG. 2 is a depiction of a plurality of subsets in an embodiment of the invention.

As shown in FIG. 2, representative samples 16 of each subset 14 are preselected and displayed to the searcher. The searcher will be able to determine a starting point for his visual search by scrolling or browsing through the representative samples 16 of each subset 14. The searcher will choose one of the sample groups, which will cause the selected subset, or preferably a portion thereof, to be displayed on a display device 30 such as a video monitor. Additionally, the display device 30 may be a equipped with certain display options whereby the searcher can limit the results which appear in the visual search results. For example, the display options may allow the searcher to limit his search results to only jewelry of a certain metal type, stone type, stone color or any other characteristic. Additionally, the display device 30 may allow the searcher to utilize a boolean search to allow the searcher to limit results by keywords in addition to utilizing the visual search.

Figure 3A:
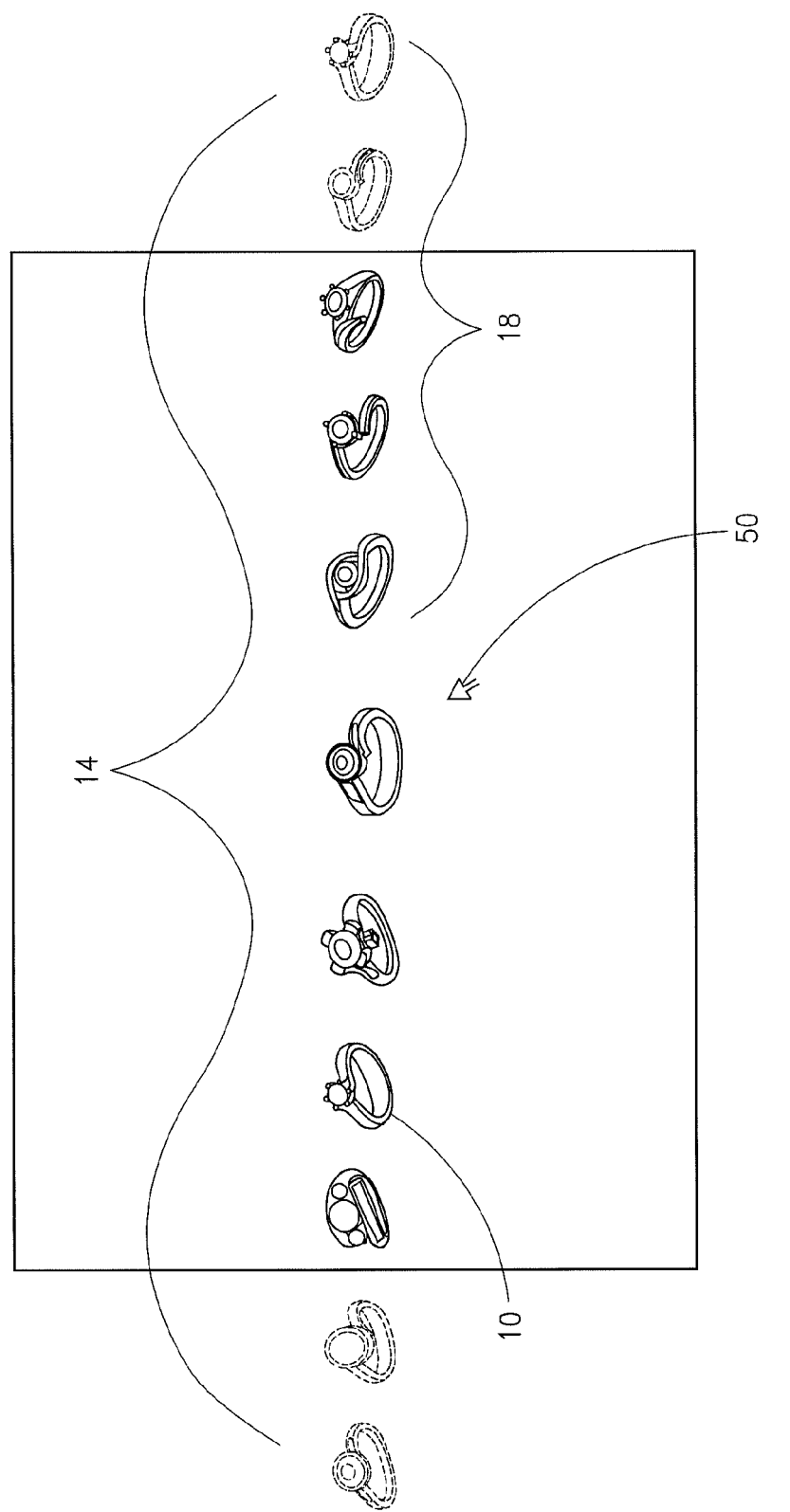
FIG. 3A is a depiction of a horizontal linear progression of a subset in an embodiment of the invention.
Figure 3B:
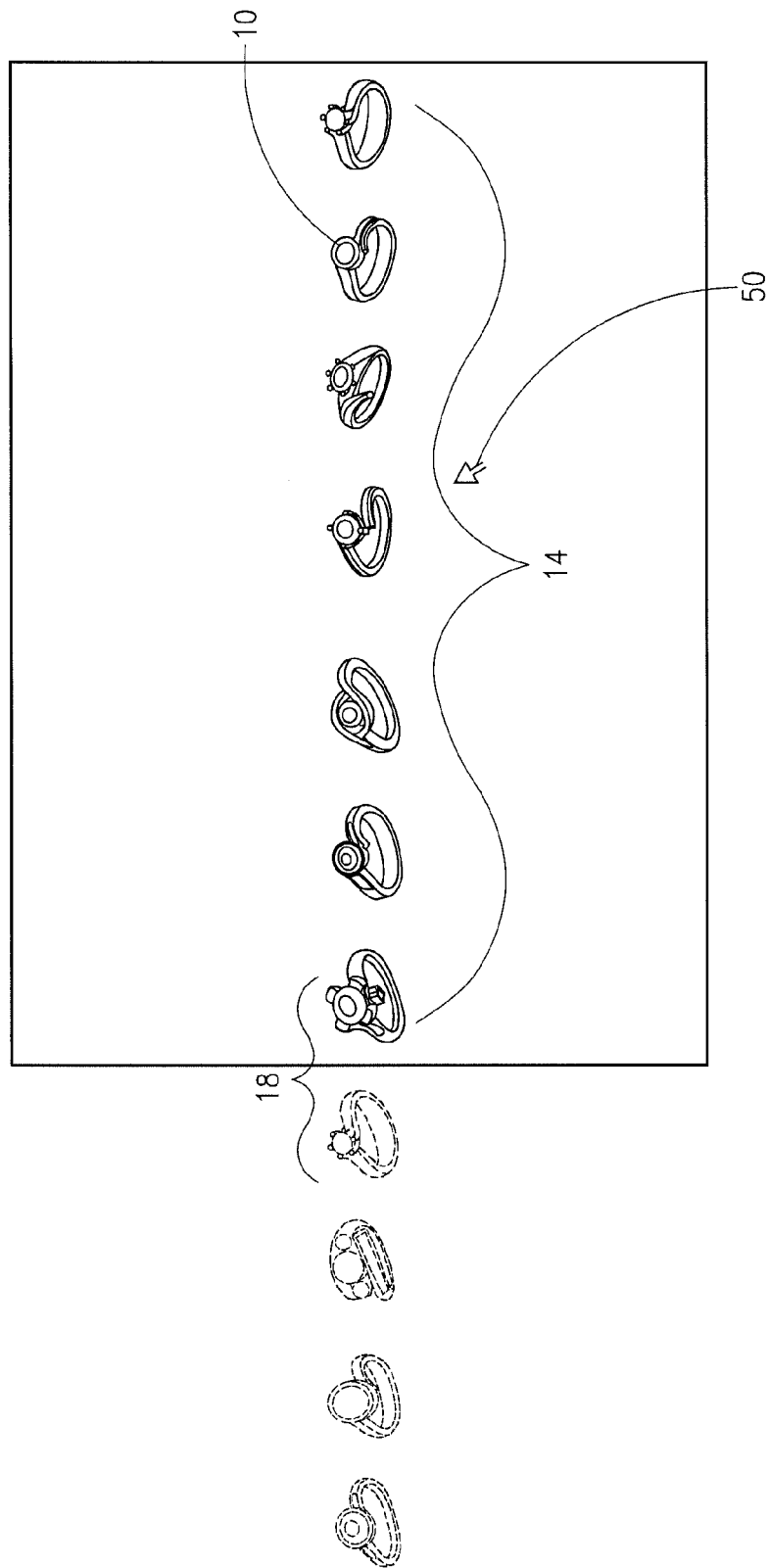
FIG. 3B is a depiction of selecting an object from a horizontal linear progression of a subset in an embodiment of the invention.
Figure 4:
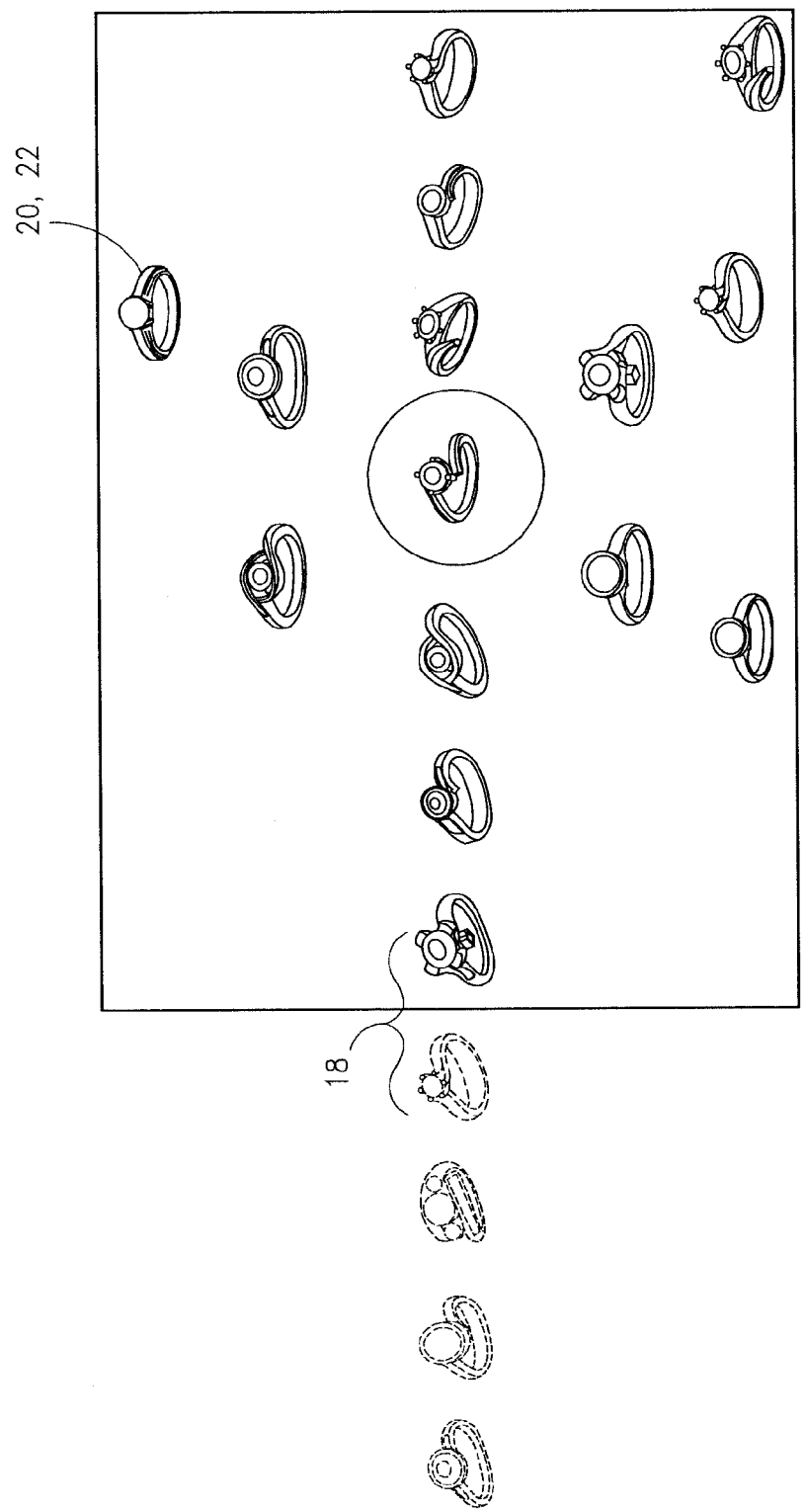
FIG. 4 is a depiction of the intersection of a plurality of linear progressions of a plurality of subsets at a selected object in an embodiment of the invention.

As depicted in FIG. 3A, the selected subset 14 can be displayed as a horizontal linear progression 18 of the objects 10 contained therein. The objects 10 may be arranged in a vertical linear progression, a diagonal linear progression or a non-linear progression; essentially, any arrangement which preserves the continuum of objects 10 is suitable for display. The searcher may then scroll through the linear progression 18 of the selected subset 14 as shown in FIG. 3B. It will be appreciated that in scrolling through the subset, the searcher will encounter objects 10 having progressively greater or lesser values of the characteristic in question. The searcher may scroll until he encounters a member of the subset 14 in which he is interested. As illustrated in FIG. 4, by selecting the image of the object 10 of interest with a mouse or other input device 28, the searcher will trigger an evaluation by the system. Additionally, the system 100 can be configured to automatically select an if the searcher pauses on an object 10 for a pre-determined amount of time.

Continuing with FIG. 4, the system 100 will check the selected object 10 to determine the number, if any, of other subsets 14 of which the selected object 10 is a member. Those other subsets 14 will then be displayed on the display device 30 as linear progressions 18 intersecting the linear progression 18 of the original selected subset 14 at the selected object 10. As discussed above, the objects 10 may belong to multiple subsets 14 depending upon the number of characteristics they possess. Thus, the number of linear progressions 18 displayed will correspond to the number of characteristics of the selected object 10.

It will be appreciated that when a selected object 10 is a member of numerous subsets, the display device 30 could become excessively crowded. In order the deal with this overcrowding, in one embodiment, the inventor has limited the number of intersecting subsets 14 to be displayed to seven, including the original subset 14.

In another embodiment, the inventor limits the number of intersecting subsets 14 to be displayed to three, including the original subset 14. An intersection comprised of three linear progressions 18 is believed to provide a visually appealing and utilitarian display. If an object 10 belongs to more than three subsets, (or other limit) the system 100 must be configured to select the subsets 14 to display. One method is to display only those subsets 14 in which the object 10 at the intersection is located closest to the center of the continuum. Thus, the subsets 14 in which the object 10 at the intersection is the best representative of the subset 14 will be displayed when the object 10 is a member of a number of subsets 14 exceeding the desired visual parameters of the display device 30. However, it will be appreciated that other methods of limiting the number of subsets 14 displayed may be adopted. For example, subsets 14 may be ranked and displayed according to the highest rank. Similarly, subsets 14 may be assigned a rank that changes depending upon the identity of the subset 14 previously or originally selected.

Figure 5A:
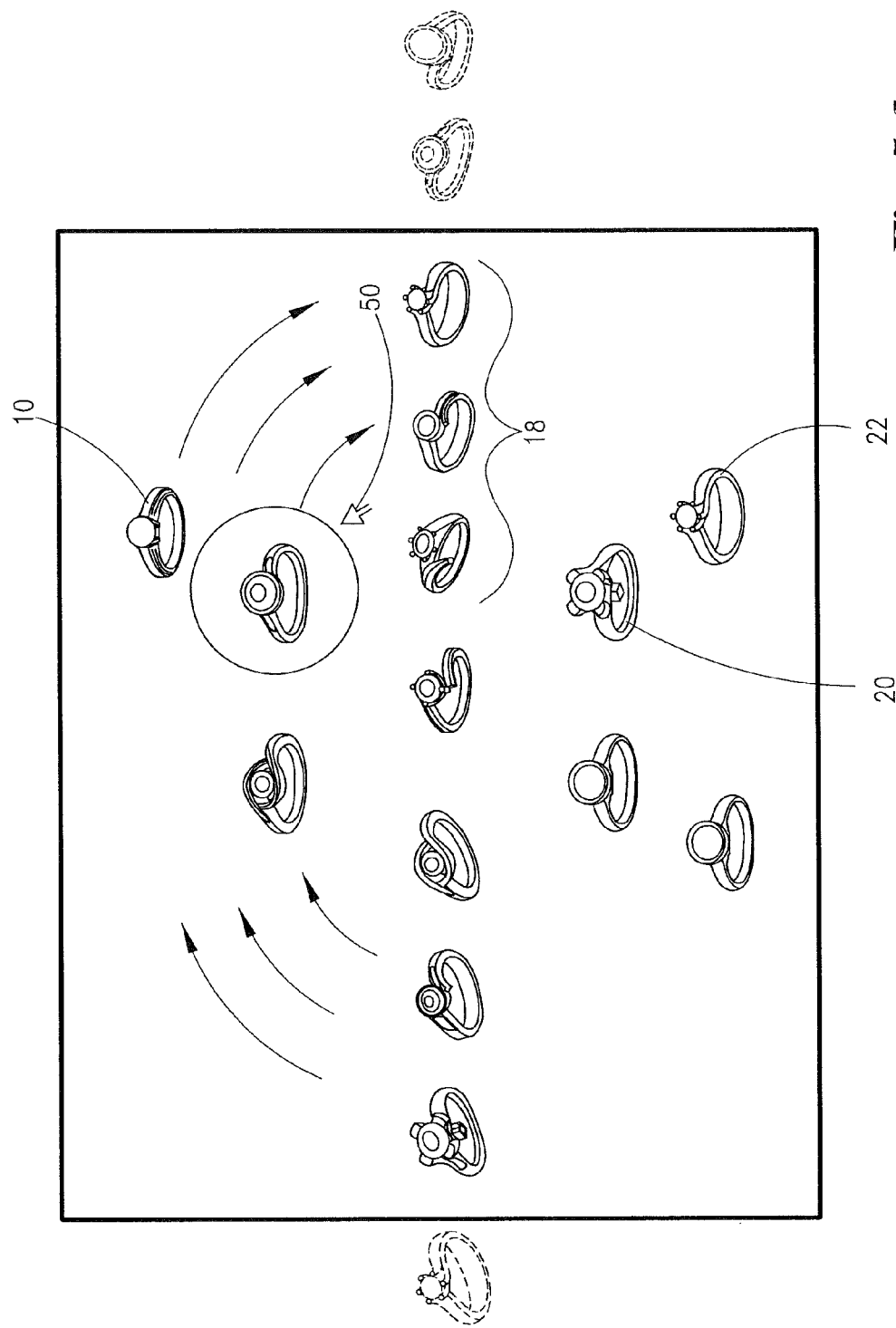
FIG. 5A is a depiction of selecting an object from a diagonal linear progression of a subset in an embodiment of the invention.
Figure 5B:
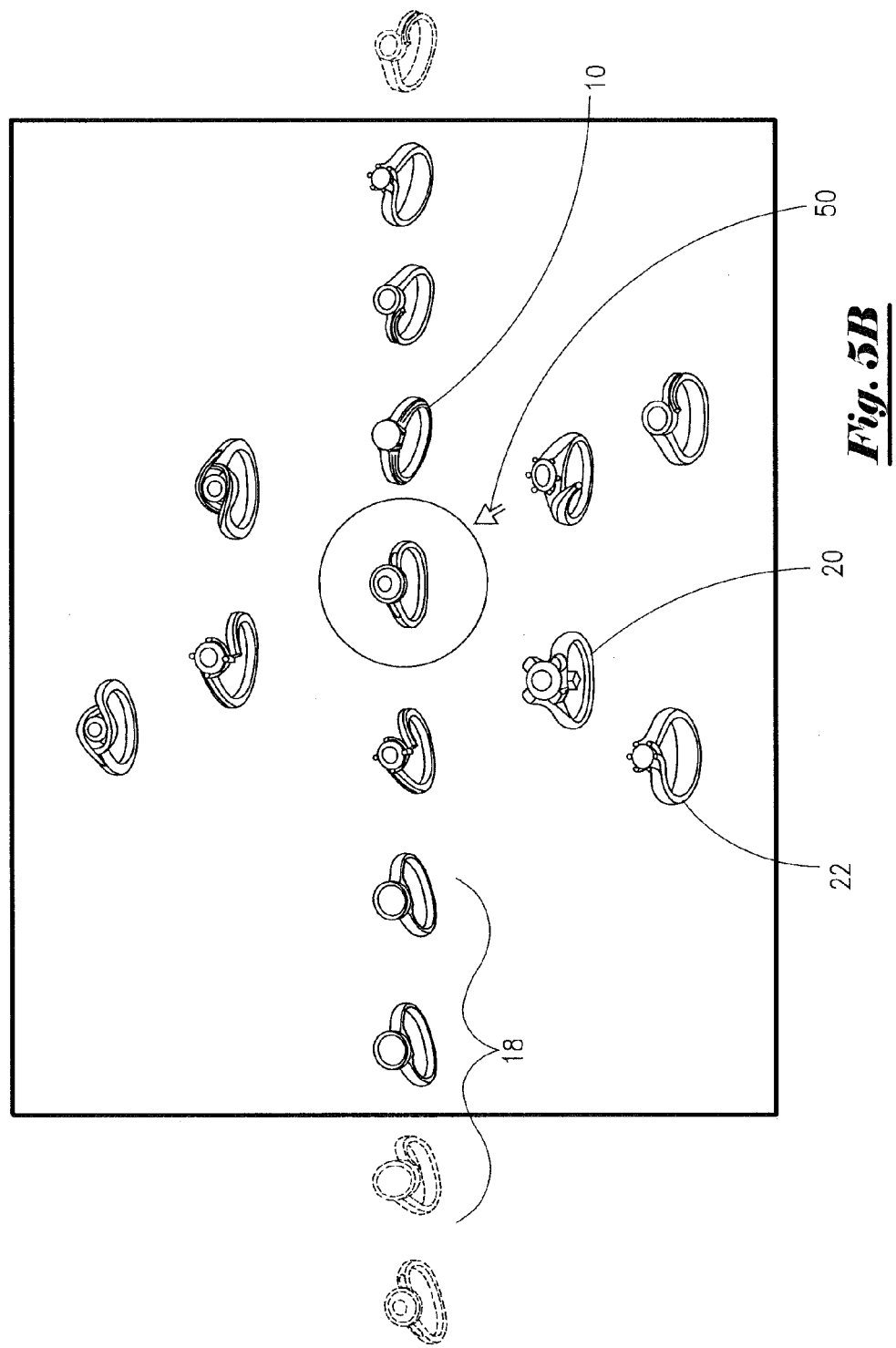
FIG. 5B is a depiction of the display responding to the searcher's selection of an object from a diagonal linear progression of a subset in an embodiment of the invention.

Once an object 10 is selected and the intersecting linear progressions 18 appear, the searcher may then either continue to scroll along the linear progression 18 of the original selected subset 14 or the searcher may select an object 10 from one of the intersecting linear progressions 18. Referring now to 5B, selecting an object 10 from one of the intersecting linear progressions 18 will cause the subset 14 corresponding to that linear progression 18 to become the selected subset 14. The orientation of the linear progression 18 associated with the new selected subset 14 will preferably change on the display device 30 so that the new selected subset 14 will be presented horizontally with the selected object 10 centrally positioned. The system 100 will determine the number of subsets, if any, of which the selected item is a member and linear progressions 18 corresponding to those subsets 14 will be shown intersecting the linear progression 18 corresponding to the new selected subset 14 at the position of the selected item, as seen in FIG. 5B. The searcher may then scroll through the linear progression 18 of the new selected subset 14 or the searcher may select an object 10 from one of the intersecting linear progressions 18.

As the searcher scrolls through the database, the searcher may move any selected object 10 into an advanced selection category, such as a shopping cart. Upon making an advanced selection, the searcher may continue searching or end his search.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited by the scope of the appended claims.

I claim:

1. A method of organizing and searching objects in a database said method comprising:
   a. selecting a plurality of subsets of said objects, wherein each said subset is defined by a characteristic and wherein each said object of each said subset possesses said defining characteristic of said subset;
   b. arranging each said subset of said objects by assigning each said object in each said subset a value that corresponds to said defining characteristic of said subset and arranging said objects within each subset along a continuum of values of said defining characteristic;
   c. displaying representative samples from each of said plurality of subsets, whereby a searcher can select one of said subsets;
   d. displaying at least a portion of said selected subset in a first linear progression, whereby said searcher can scroll according to an ascending or descending value of said defining characteristic of said selected subset;
   e. selecting an object from said first linear progression;
   f. verifying said selected object's membership in at least one other subset;
   g. displaying at least a portion of said at least one other subset as a second linear progression intersecting said first linear progression at said selected object common to said first and second subsets.

2. The method of organizing and searching objects from a database according to claim 1 further comprising verifying said selected object's membership in a plurality of other subsets.

3. The method of organizing and searching objects from a database according to claim 2 further comprising displaying at least a portion of said plurality of other subsets as linear progressions intersecting said first linear progression at said selected object common to said first subset and said plurality of other subsets.

4. The method of organizing and searching objects from a database according to claim 2 wherein said searcher selects an object from said second linear progression.

5. The method of organizing and searching objects from a database according to claim 4 whereby said searcher is able to scroll along said second linear progression according to an ascending or descending value of said defining characteristic of said selected subset.

6. The method of organizing and searching objects from a database according to claim 1 wherein each of said subsets further comprises jewelry.

7. The method of organizing and searching objects from a database according to claim 1 wherein each of said subsets further comprises rings.

8. The method of organizing and searching objects from a database according to claim 1 wherein said searcher can narrow the results displayed from the database according to boolean combinations.

9. The method of organizing and searching objects from a database according to claim 1 wherein at least one object in at least one subset possesses the defining characteristics of said at least one subset in a value equal to zero.

10. A system for organizing and searching objects in a database, said system comprising:
    a central processing unit;
    an input device operatively connected to said central processing unit;
    a display device operatively connected to said central processing unit;
    a memory operatively connected to said central processing unit; said memory containing said database, said database comprising a plurality of subsets of said objects, wherein each said subset is defined by a characteristic, wherein each said object of each said subset possesses said defining characteristic of said subset; each said object in each said subset having a value corresponding to said defining characteristic of said subset of which each said object is a member, and wherein said objects are arranged within each subset along a continuum of values of said defining characteristic;
    said central processing unit further configured to display representative samples from each of said plurality of subsets on said display device, whereby a searcher can select one of said subsets;
    said central processing unit further configured to display at least a portion of said selected subset in a first linear progression, said central processing further configured to allow said searcher to scroll through said first linear progression on said display device according to an ascending or descending value of said defining characteristic of said selected subset;
    said central processing unit further configured to allow said searcher to select an object from said first linear progression;
    said central processing unit further configured to verify said selected object's membership in at least one other subset; and
    said central processing unit further configured to display, on said display device, at least a portion of said at least one other subset as a second linear progression intersecting said first linear progression at said selected object common to said first and second subsets.

11. The system for organizing and searching objects in a database according to claim 10 wherein said central processing unit is further configured to verifying said selected object's membership in a plurality of other subsets.

12. The system for organizing and searching objects in a database according to claim 10 wherein said central processing unit is further configured to display, on said display device, at least a portion of said plurality of other subsets as linear progressions intersecting said first linear progression at said selected object common to said first subset and said plurality of other subsets.

13. The system for organizing and searching objects in a database according to claim 10 wherein at least one of said objects represents an article of jewelry.

14. The system for organizing and searching objects in a database according to claim 13 wherein at least one of said objects represents a ring.

15. The system for organizing and searching objects in a database according to claim 10 wherein said central processing unit is further configured to conduct boolean search operations on said database, whereby the results displayed on said display device may be narrowed.

16. The system for organizing and searching objects in a database according to claim 10 wherein at least one object in at least one subset possesses the defining characteristic of said at least one subset in a value equal to zero.

* * * * *